Jan. 27, 1931.  A. S. HUGHES  1,790,379
DOUBLE ACTING TAIL GATE
Filed Jan. 8, 1927  2 Sheets-Sheet 1
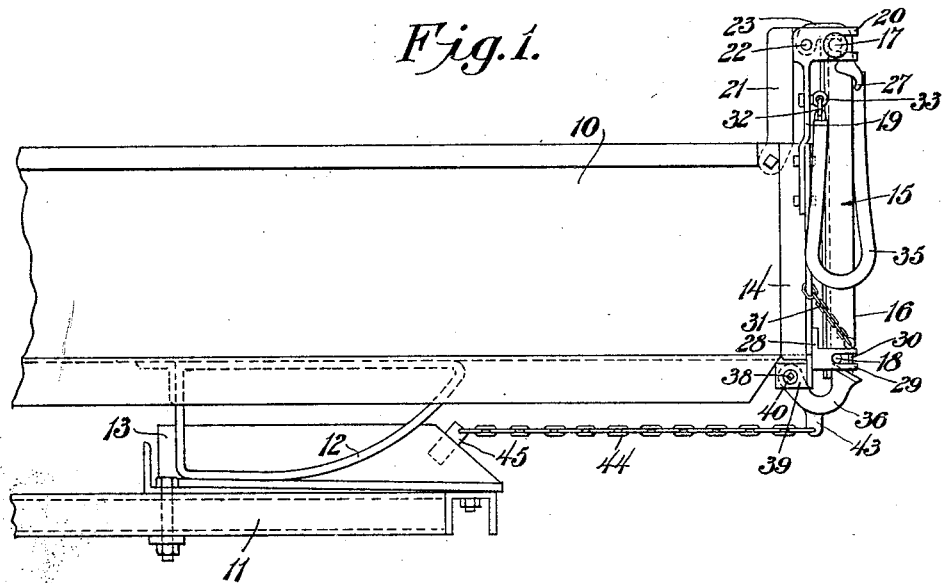
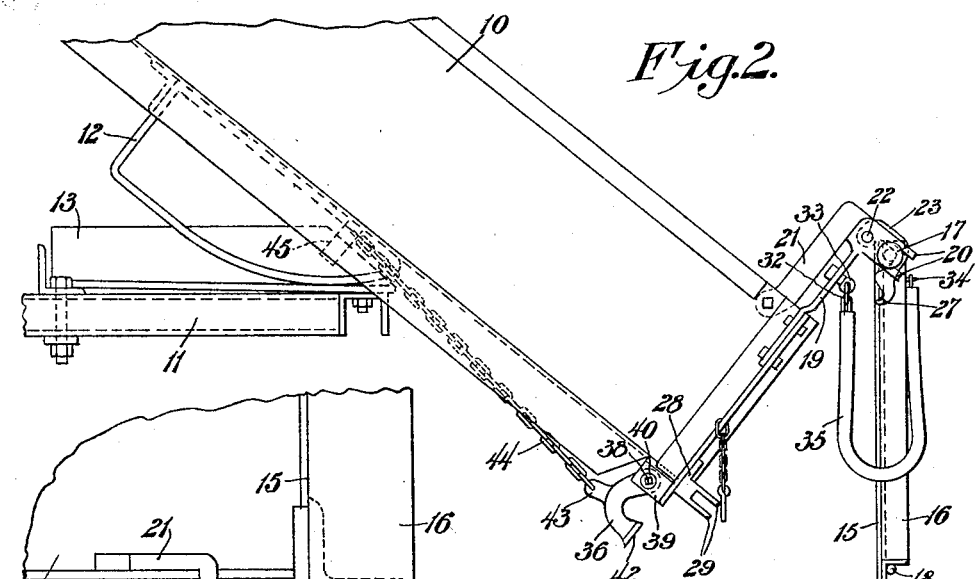
Witnesses
C. L. McDonald
E. N. Lovewell
Inventor
Arthur S. Hughes
By
E. G. Siggers
Attorney Jan. 27, 1931.  A. S. HUGHES  1,790,379
DOUBLE ACTING TAIL GATE
Filed Jan. 8, 1927  2 Sheets-Sheet 2
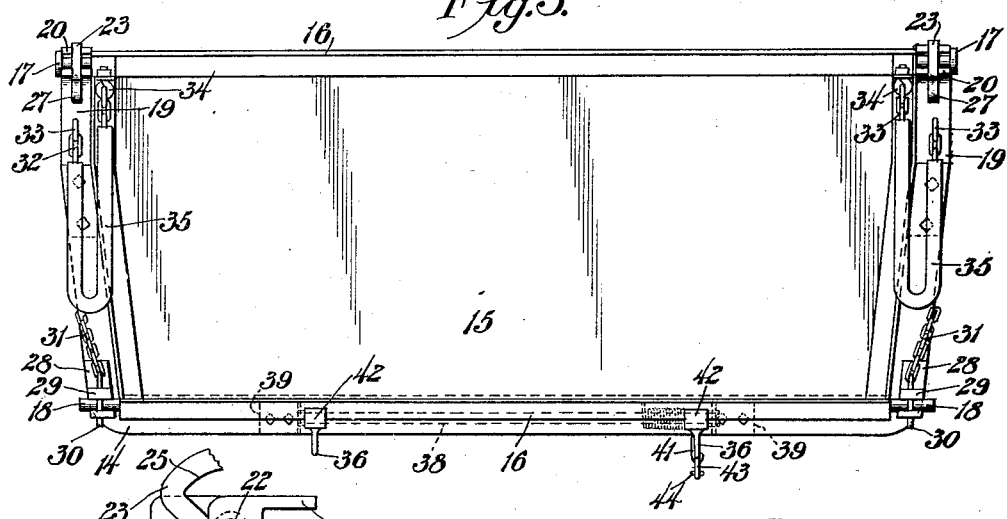
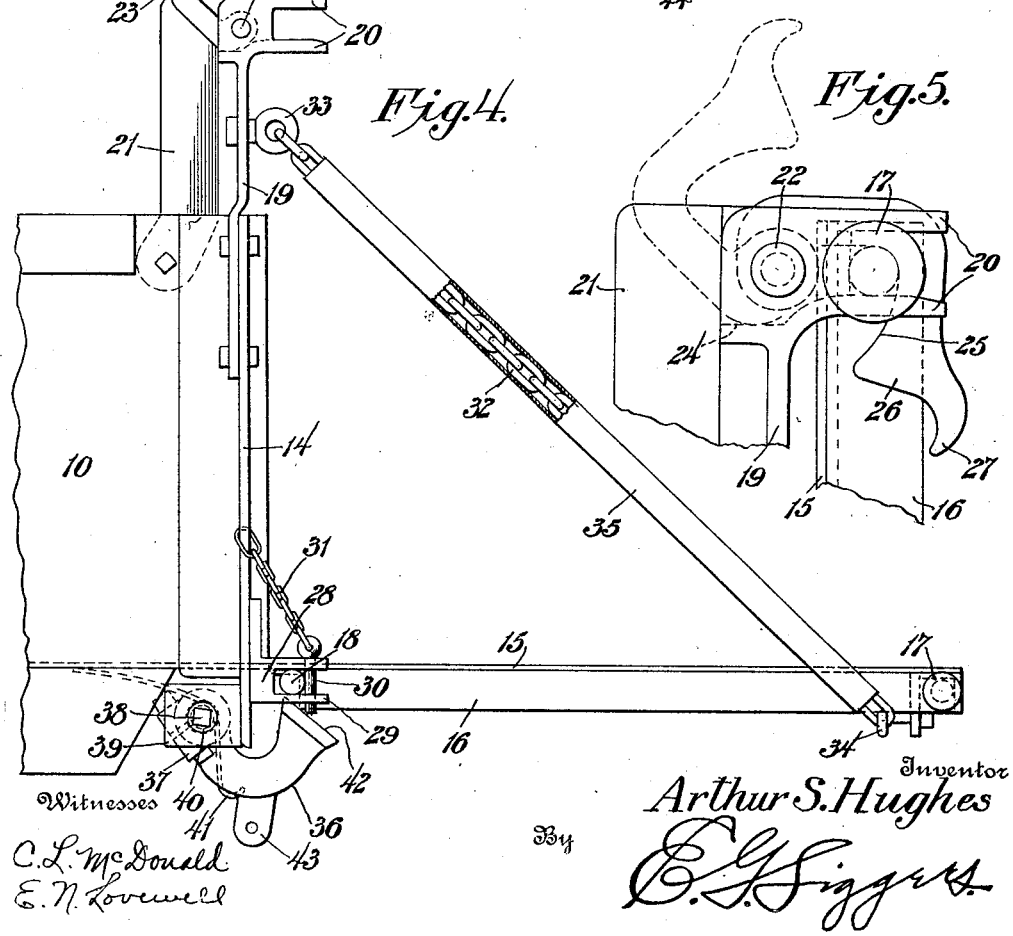
Inventor
Arthur S. Hughes Patented Jan. 27, 1931

1,790,379

UNITED STATES PATENT OFFICE

ARTHUR SHERIDAN HUGHES, OF MANSFIELD, OHIO

DOUBLE-ACTING TAIL GATE

Application filed January 8, 1927. Serial No. 159,839.

This invention relates to a tail gate which has been devised with special reference to its use on tiltable bodies of motor trucks or wagons, and which is so constructed that it may be opened by swinging it about either upper or lower pivots.

The object of the invention is to provide a tail gate of this type, which is simple in its construction and may be easily adapted for use on any vehicle body, and which is easy to manipulate and control as it swings about either axis. It is preferred also to provide means for opening or closing the gate automatically as the body moves to a tilted or a horizontal position.

The specific construction by which the desired objects are attained and the mode of operation of the same will be more particularly explained in connection with the accompanying drawings, illustrating the invention in its preferred form.

In the drawings:

Figure 1 is a side elevation of the rear portion of a truck body with the tail gate thereon, the same being shown in normal position.

Figure 2 is a side elevation of the same in dumping position.

Figure 3 is a rear elevation of the truck body and gate.
Figure 4 is a side elevation of the tail gate on an enlarged scale, showing the gate swung downwardly about its lower pivots.

Figure 5 is an enlarged side elevation of one of the upper pivots.
Figure 6 is a plan view of the same.

The tail gate, to which the invention pertains, is shown associated with a dumping truck body 10, which is mounted on a chassis 11. The connection between the truck body and chassis may be of any approved construction, but preferably comprises rockers 12 secured to the under side of the body and resting on tracks 13, which are bolted to the chassis frame. The specific construction of this connection, however, forms no part of the present invention. An angle bar 14 is secured to the rear end of the truck body 10, and extends about the bottom and side walls thereof to provide a reinforcement.
The tail gate 15, which is adapted to close the rear end of the body 10, has angle bars 16 secured to its perimeter, and has trunnions 17 and 18 extending outwardly from its upper and lower corners, respectively. Secured to each end of the angle bar 14 is a bracket 19, which extends upwardly from the body 10, and terminates in a pair of rearwardly disposed ears 20. The trunnions 17 are received by the ears 20. Each bracket 19 is securely braced by a flange 21, which extends forwardly and is secured to the side of the body 10. A pivot pin 22 is mounted in the bracket 19 behind the ears 20, and serves to pivotally support a latch 23. As illustrated herein, the upper end of the bracket 19 is formed with a channel 24, which is traversed by the pin 22, and in which the latch 23 is seated, but this arrangement may be considerably modified without altering the results obtained. The dog 23 is shaped so as to hook over the trunion 17, as shown in Figures 1, 2, 3 and 5, and the inner edge 25 of the hook is arcuate and concentric with the pivot pin 22. The end of the hook is extended, as at 26, and is heavy enough so that whether the body and gate are in the position shown in Figure 1 or Figure 2, the latch will be held by gravity in engagement with the trunnion 17, and in connection with the ears 20 will form a journal therefor. The latch is also formed with a finger 27, by means of which it may be raised to the position shown in Figure 4, and shown in dotted lines in Figure 5, to permit the gate 15 to swing downwardly about the lower trunnions 18 as an axis, to the position shown in Figure 4.

To each lower rear corner of the body 10, there is secured a bracket 28 having rearwardly projecting ears 29, between which the trunnion 18 is received. The ears 29 are perforated to receive a pin 30 for retaining the trunnion 18 therebetween, and the pin 30 is preferably connected by a chain 31 to some part of the wagon body, so that it will not become lost when the gate is swung outwardly about its upper axis, as shown in Figure 2.

When the gate 15 is swung downwardly, as shown in Figure 4, it is supported substantially in alinement with the floor of the body 10 by means of chains 32. Each of these chains is connected at one end with an eye 33 secured to the bracket 19, and is connected at its other end to an eye 34, secured to the corner of the gate. The chain 32 is preferably covered with a flexible sheath 35 to protect it from dirt and the weather.

The slot between the ears 29 is deep enough so as to permit a limited amount of play between each trunnion 18 and the bracket 28, so that the lower portion of the gate may clear the truck body when swung to the position wherein the gate lies in the same plane as the bottom of the body, Fig. 4. In this last position, the downwardly extending flange of the lower angle bar on the tail gate pushes the latches down slightly, as shown in Fig. 4, so as to obviate interference between the latches and the angle bar when the gate is swung upwardly to body-closing position, while the horizontal flange of the lower angle bar is permitted to lie in the same plane with the body bottom, thus closing the gap between the tail gate and said bottom. When the gate 15 is closed, play in trunnions 18 is normally prevented by latches 36, which engage the lower flange of the angle bar 16 (Fig. 1). Each latch 36 is formed with a split sleeve 37, which is clamped to a square shaft 38, rockably mounted in ears 39 secured to the angle bar 14. Each latch 36 is secured to the shaft 38 near one of the ears 39, and is formed with a boss 40, which extends through the ear and constitutes a bushing for rotatably supporting the shaft. A strong spring 41 is provided adjacent one of the latches 36, which normally holds the latches in engagement with the lower edge of the gate, and the ends of the latches are beveled, as shown at 42, so that as the gate swings from the position shown in Figure 2 to that shown in Figure 1, the lower edge of the gate will ride over these beveled ends, and the latches will automatically snap into engagement with the edge of the gate to hold the latter tightly closed.

One of the latches is formed with a lug 43 to which one end of a chain, or other flexible element, 44 is connected, the other end of the chain being connected to a lug 45 secured to one of the tracks 13, or other suitable part of the chassis. It will be seen, therefore, that as the body 10 rocks rearwardly on the rockers 12, it will also be moved horizontally with respect to the chassis by a distance equal to the difference in length between the straight track 13 and the curved rocker 12. This will cause the chain 44 to pull the latches 36 downwardly and release the lower edge of the gate, so that it will automatically swing outwardly, as shown in Figure 2.

In the automatic operation of the tail gate, it will be understood that the pins 30 are first withdrawn, so that the gate will open as soon as the latches 36 are retracted by the chains 44, when the truck body is tilted. If it is desired to swing the gate rearwardly about the trunnions 17 while the body is horizontal, this may be easily accomplished by knocking or pulling the latches 36 downwardly. When it is desired to swing the gate downwardly about the trunnions 18 as an axis, it is preferred to first disengage the latches 36 from the lower edge of the gate while the pins 30 remain in position. This allows the lower edge of the gate to swing outwardly a slight distance, and thereby rocks the trunnions 17 sufficiently to lessen their pressure against the arcuate edges 25 of the dogs 23, so that the latter may be lifted with very little exertion. This permits the gate to swing downwardly to the position shown in Figure 4. When the gate is again closed, the flanges at the lower edge of the gate will again become automatically engaged with the latches 36.

While I have shown and described the present embodiment of the invention in detail, it is apparent that the same is capable of considerable modification without any material departure from the essential features of the invention as claimed.

What is claimed is:

1. The combination with a body, of a gate having at its upper edge a pivotal connection with said body, a shaft non-circular in cross section and arranged parallel to the lower edge of the gate, members secured to the body and supporting the shaft, latches secured to the shaft and formed with bosses which project through said members to constitute bushings which are rockable with the shaft in said members, and means holding the latches normally engaged with the lower edge of the gate to hold it closed, but yieldable to permit the latches to be tripped to release the gate.

2. The combination with a rearwardly tiltable body, of a gate having at its upper edge a pivotal connection with the body, a shaft non-circular in cross section and arranged parallel to the lower edge of the gate, members secured to the body and supporting the shaft, latches secured to the shaft and formed with bosses which project through said members and constitute bushings which are rockable with the shaft in said members, yieldable means for holding the latches in engagement with the lower edge of the gate to hold the latter closed, and positive means for automatically tripping the latches as the body is tilted.

3. The combination with a body having rockers secured to the under side thereof and a chassis having tracks on which the rockers are mounted, of a tail gate having at its upper edge a pivotal connection with said body, a shaft non-circular in cross section arranged parallel to the lower edge of the gate, members secured to the body and supporting the shaft, latches formed with collars which are secured to the shaft, each collar having an extension which projects through the adjacent supporting member and constitutes a bushing which is rockable with the shaft in said member, one of said latches having a downwardly projecting ear, and non-stretchable means connecting said ear with a point on the chassis above the surface on which the body rocks, whereby to trip the latches when the body is rocked rearwardly.

4. In combination with a dump body, a tail gate carried by the body and having upper and lower trunnions for pivotal movement selectively at either its top or bottom; the lower end of the gate having a reinforcing angle; upper and lower bearing members for said trunnions; a spring-actuated latch pivoted to the body below the tail gate and engaging the downwardly projecting flange of the reinforcing angle when the gate is in body-closing position and holding the lower end of the gate against the bottom of the body; an upper latch to hold the gate at its top; the lower trunnions being movable to a limited extent outwardly from the body in the aforesaid lower bearing members, so that free swinging of the gate on its lower trunnions to outwardly extending position is facilitated and the aforesaid flange is brought into the plane of the bottom of the body, closing the gap between the tail gate and said bottom; the other flange of the gate reinforcing angle projecting downwardly when the gate is outwardly extended and then pushing out of the way the free end of the lower latch so as to obviate interference between said latch and said reinforcing angle when the gate is swung upwardly to body-closing position.

In testimony, that I claim the foregoing as my own, I have hereto affixed my signature.

ARTHUR SHERIDAN HUGHES.